United States Patent
Babala

(10) Patent No.: US 7,040,166 B2
(45) Date of Patent: May 9, 2006

(54) MULTIPLE OUTPUT INERTIAL SENSING DEVICE

(75) Inventor: Michael L. Babala, Plymouth, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 11/105,146

(22) Filed: Apr. 13, 2005

(65) Prior Publication Data

US 2005/0172715 A1 Aug. 11, 2005

Related U.S. Application Data

(62) Division of application No. 10/679,794, filed on Oct. 6, 2003, now Pat. No. 6,925,876, which is a division of application No. 09/919,427, filed on Jul. 31, 2001, now Pat. No. 6,701,788.

(51) Int. Cl.
*G01P 15/08* (2006.01)

(52) U.S. Cl. .................................. 73/514.35

(58) Field of Classification Search ............. 73/510, 73/514.01, 514.16, 514.35; 280/735; 340/669
See application file for complete search history.

(56) References Cited

U.S. PATENT DOCUMENTS

| | | | |
|---|---|---|---|
| 3,781,824 A * | 12/1973 | Caiati et al. ............. 346/33 R |
| 3,925,643 A | 12/1975 | Roantree et al. | |
| 4,346,597 A * | 8/1982 | Cullen ........................ 73/510 |
| 4,784,237 A | 11/1988 | Condne et al. | |
| 4,996,877 A | 3/1991 | Stewart et al. | |
| 5,007,289 A | 4/1991 | Stewart et al. | |
| 5,345,824 A | 9/1994 | Sherman et al. | |
| 5,473,945 A * | 12/1995 | Grieff et al. ................. 73/510 |
| 5,487,305 A | 1/1996 | Ristic et al. | |
| 5,594,647 A * | 1/1997 | Yasuda et al. ................ 701/45 |
| 5,610,337 A | 3/1997 | Nelson | |
| 5,736,923 A | 4/1998 | Saab | |
| 5,780,742 A | 7/1998 | Burns et al. | |
| 5,817,942 A | 10/1998 | Greiff | |
| 5,905,203 A * | 5/1999 | Flach et al. .............. 73/514.32 |
| 5,996,412 A | 12/1999 | Hansen | |
| 6,023,664 A | 2/2000 | Bennet | |
| 6,076,403 A | 6/2000 | Giroud et al. | |
| 6,273,514 B1 | 8/2001 | Hulsing | |
| 6,386,040 B1 * | 5/2002 | Broillet et al. ................ 73/593 |
| 2002/0184949 A1 | 12/2002 | Gianchandani et al. | |

FOREIGN PATENT DOCUMENTS

EP  0 686 830 A1  12/1995

* cited by examiner

Primary Examiner—John E. Chapman
(74) Attorney, Agent, or Firm—MacMillan, Sobanski & Todd, LLC.

(57) ABSTRACT

An inertial sensor includes a single linear accelerometer disposed upon a silicon wafer. The accelerometer is electrically connected to a plurality of signal conditioning circuits that generate an output signals in different ranges. Each signal conditioning circuit has an output that is electrically connected to an associated control device.

5 Claims, 3 Drawing Sheets

MULTIPLE OUTPUT INERTIAL SENSING DEVICE

CROSS REFERENCE TO RELATED APPLICATIONS

This application is a divisional of application Ser. No. 10/679,794 filed Oct. 6, 2003 now U.S. Pat. No. 6,925,876, which was a divisional of application Ser. No. 09/919,427 filed Jul. 31, 2001, now U.S. Pat. No. 6,701,788.

BACKGROUND OF INVENTION

The present invention relates generally to inertial sensors and, in particular, to a multiple output inertial sensing devices, which can ideally be used for motor vehicle safety systems.

Lateral inertial sensors, or accelerometers, are well known devices that sense acceleration generated from an external source such as a body to which they are attached. Accelerometers typically contain three main components. A first component is a mass, known in the art as a seismic mass or proof mass, that moves in response to the external body's acceleration. The proof mass is held in a rest position by a second component, which is a spring or a member that functions as a spring. A displacement transducer that measures the motion of the proof mass in response to acceleration is the third component. Upon acceleration, the mass moves from its rest position, either compressing or stretching the spring. The transducer detects the movement of the mass and converts the movement into an electrical output signal. The output signal, which may be amplified and filtered by signal conditioning electronics for more accurate measurement, is then transmitted to a control circuit or a control device that responds to the detected acceleration. The spring usually restricts the proof mass to movement in a single direction or axis. Accordingly, the accelerometer provides a directional acceleration signal. The three components of the accelerometer, the proof mass, the spring, and the transducer, are collectively known as a sensor or sense element.

Accelerometers typically utilize either a piezoelectric displacement transducer or a capacitive transducer. In piezoelectric displacement transducers, the motion of the proof mass is converted into the electrical output signal by the change in resistance of a piezoresistive material as it is expands or contracts. Piezoelectric transducers, however, have the disadvantage of being sensitive to heat and stress, which generally requires the use of expensive compensating electronic circuits. In capacitive transducers, the motion of the proof mass is converted by having the motion alter the capacitance of a member, which is then measured. Though capacitive transducers also have limitations, such as parasitic capacitance of their associated conditioning electronics, they are preferred because they are relatively unaffected by temperature and may be readily measured electronically.

Accelerometers have been used in many different applications, including vibration measurement, for example of rotating equipment, as well as shock measurement, inertial navigation systems and motor vehicle control systems. Conventional accelerometers, such as those disclosed in U.S. Pat. No. 4,945,765, are physically large and relatively expensive to produce. As a result, few conventional accelerometers have been installed on motor vehicles because of their size, weight, and cost.

Recently, semiconductor accelerometers have been developed that include the sense elements described above that are reduced in size and are mounted on a silicon chip. As a result semiconductor accelerometers are much smaller than conventional accelerometers and thus design options regarding the location of the accelerometer are more flexible. In addition, semiconductor accelerometers are less expensive to produce than the conventional accelerometers noted above.

Semiconductor accelerometers are typically manufactured utilizing either a bulk manufacturing technique or a surface manufacturing technique, both of which are well known in the art. Both bulk and surface manufacturing techniques are classified as Micromachined ElectroMechanical Systems (MEMS.) In bulk manufacturing techniques, the transducer and associated electronics are typically located external to the silicon chip. In surface manufacturing techniques, the transducer and electronics can be mounted on the silicon chip, further reducing the accelerometer's size requirements.

The use of accelerometers in motor vehicles, therefore, is becoming more prevalent. They have been used in modern automobile safety systems to sense changes in acceleration and provide a control signal for vehicle control systems, including speed control systems and antilock braking systems. They have also been used to sense crash conditions in order to provide a signal to trigger the release of vehicle supplemental restraint systems, more commonly known as airbags. Accelerometers in vehicle safety systems are typically calibrated to measure the changes in acceleration in terms of G-forces. One G-force, or "G", is equal to the acceleration of gravity (9.8 m/s$^2$ or 32.2 ft/s$^2$.) Accelerometers utilized in vehicle control systems typically provide signals for "low" sensed accelerations in the range of 1.5 G while accelerometers utilized in crash sensing systems typically provide signals for "high" sensed accelerations in the range of 40 G.

In addition to sensing changes in lateral acceleration, motor vehicle control systems also utilize angular rate sensors to sense changes in angular velocity. Although angular rate sensors typically measure the change in rotational velocity of a vibrating ring rather than the change in acceleration of a proof mass, angular rate sensors also include transducers and are mounted upon silicon chips. Similar to accelerometers, angular rate sensors are utilized to supply control signals to vehicle control systems, such as, roll control systems and rollover sensing systems. Again, as with the lateral accelerometer described above, the vehicle control systems that utilize angular rate sensors can require different trigger levels. Thus, a roll control system responds to signals have smaller magnitudes than those utilized by a roll over sensing system. Angular rate sensors and accelerometers are known collectively hereinafter as inertial sensors.

Prior art motor vehicle safety systems that utilized semiconductor inertial sensors typically utilized a separate semiconductor inertial sensor for each control system. Each inertial sensor in turn required a separate Application Specific Integrated Circuit (ASIC) to process the sensor signal. Separate inertial sensors increased the overall cost of each system because each ASIC and inertial sensor had to be purchased individually. Each inertial sensor and ASIC required a fixed amount of space for installation, which correspondingly increased the size and reduced the design flexibility of the various control or safety systems due to the bulkiness of the inertial sensors.

As inertial sensor manufacturing technology becomes more mature, advances in MEMS technology continue to be realized. These ongoing technology developments in MEMS allow for the continued miniaturization and integration of the sense elements and electronics of semiconductor inertial sensors. It would be desirable, therefore, to utilize MEMS technology developments to reduce the size of the inertial sensors of the prior art. It also would be desirable to reduce the number of inertial sensors and ASICs, to increase the design flexibility in locating the inertial sensors and ASICs, to reduce the overall size of the system, and to create inertial sensors that can be used as common components in various vehicle control systems.

SUMMARY OF INVENTION

The present invention contemplates a single inertial sensor that provides multiple output signals for different ranges of operation. The inertial sensor includes a silicon wafer that carries a plurality of inertia sense elements. Each sense element is calibrated to sense a change in acceleration or a change in angular velocity for a predetermined range. Thus, a low-G sense element can be provided for a vehicle directional control system, while a high-G sense element can be provided for vehicle crash sensing. Similarly, a low range angular rate sensor can be provided for a roll control system while a high range angular rate sensor can be provided for a rollover detection system.

Each of the sense elements is electrically connected to either a common signal conditioning circuit or a corresponding separate signal conditioning circuit. The signal conditioning circuit amplifies and filters the output signal from each of the sense elements and generates an enhanced output signal for each of the sense elements. The output signals are transmitted to associated control systems.

Alternately, the invention contemplates a single sense element carried by a silicon wafer. The output of the single element is electrically connected to multiple signal conditioning circuits with different sensitivities that convert the signal generated by the sense element into output signals in different ranges.

The present invention also contemplates multiple inertial sensors carried by a single wafer that sense changes in inertia along or about more that one vehicle axis.

Accordingly, it is an object of the present invention, to incorporate multiple sense elements upon a single silicon wafer and integrate these multiple sense elements into the same inertial sensing device. By integrating the multiple sense elements, the size requirements for the inertial sensors and associated circuit boards are significantly reduced with a corresponding increase in packaging flexibility.

It is another object of the present invention to create inertial sensors that can be used as common components in various vehicle control or safety systems, which will reduce the overall cost of the safety systems.

Various other objects and advantages of this invention will become apparent to those skilled in the art from the following detailed description of the preferred embodiment, when read in light of the accompanying drawings.

DETAILED DESCRIPTION

Figure 1:
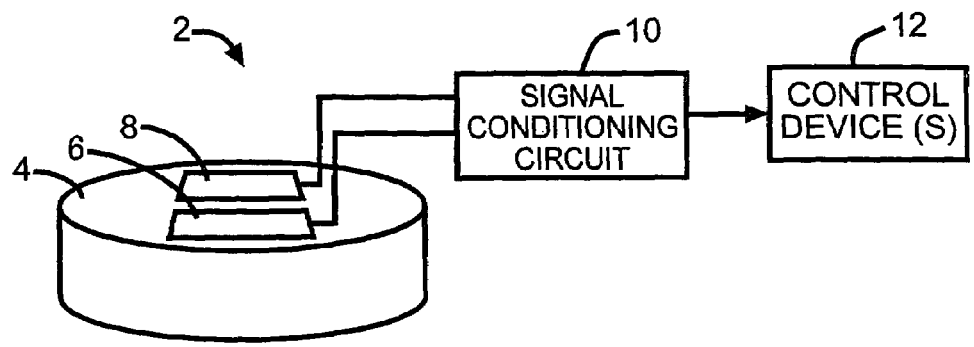
FIG. 1 is a schematic diagram of an inertial sensor in accordance with the present invention.

Referring now to FIG. 1, a multiple output inertial sensor is shown generally at 2. The sensor 2 contains a silicon wafer 4. Embedded in the silicon wafer 4 is a pair of sense elements 6 and 8. The sense elements 6 and 8 may be lateral acceleration sense elements (accelerometers) or angular rate sense elements. In the case of accelerometers, the sense elements 6 and 8 may contain one proof mass (not shown) and two transducers (not shown), one proof mass and one transducer with electronic switching (not shown) to produce a signal for multiple ranges, or two proof masses and two transducers. In addition, the sense elements 6 and 8 may contain integral transducers (not shown), or the transducers may be part of the overall circuit outlined below. The invention contemplates that the sense elements 6 and 8 could be formed simultaneously, side by side, on the silicon wafer 4, with little or no adverse impact on the wafer manufacturing time. Alternately, the sense elements 6 and 8 could be manufactured separately and later mounted together in a single package.

While two sense elements 6 and 8 have been shown in FIG. 1, it will be appreciated that the invention also may be practiced with more than two sense elements embedded in the wafer 4.

Each of the sense elements 6 and 8 is calibrated to sense changes for a different range of linear acceleration or 'G'-forces, in the case of accelerometers. Alternately, for angular rate sensors, each sense element is calibrated to sense a change in angular velocity for a different range of angular velocity. In the preferred embodiment, the sensor ranges are non-overlapping. The outputs of the transducers of the sense elements 6 and 8 are electrically connected to the input of a signal conditioning circuit 10, which functions to amplify and filter the output signals from each of the sense elements 6 and 8. The signal conditioning circuit 10 is electrically connected to one or more vehicle control systems, or devices 12, such as, for example a vehicle stability control system that maintains directional control of a vehicle or an air bag deployment system. The signal conditioning circuit 10 is responsive to the sense element signals to generate an output signal that includes the data information from the sense elements and is transmitted to the vehicle control system. The output signal triggers an appropriate response from the associated control system of systems.

In the preferred embodiment, the signal conditioning circuit 10 is included in an Application Specific Integrated Circuit (ASIC) (not shown). The signal conditioning circuit 10 can be either located remotely from the silicon wafer 4, as shown in FIG. 1, or it can be mounted upon the wafer 4 with the sense elements 6 and 8 (not shown). The inertial sensor 2 is preferably mounted upon a printed circuit board (not shown) with connections for a power supply (not shown) and control devices or systems (not shown) that process the signal from the inertial sensor 2.

Figure 2:
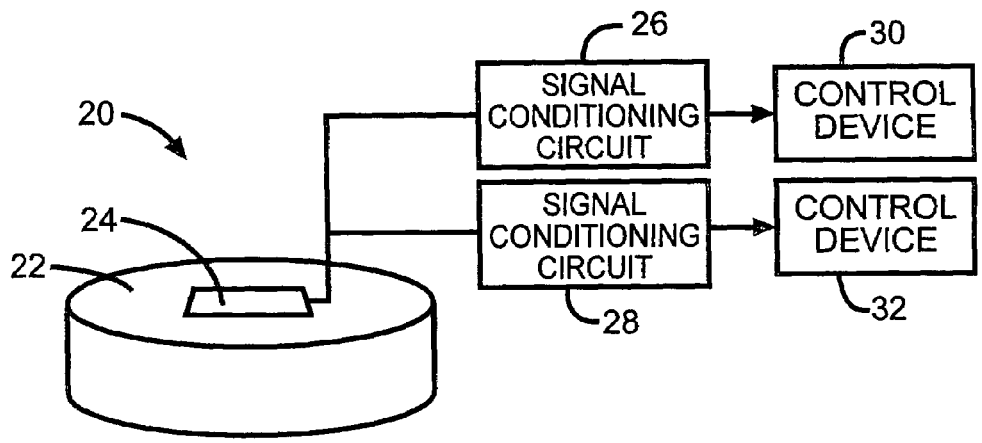
FIG. 2 is a schematic diagram of an alternative embodiment of the inertial sensor shown in FIG. 1.

Referring now to FIG. 2, an alternative embodiment of the multiple output inertial sensor is shown generally at 20. The sensor 20 includes a silicon wafer 22 that is manufactured in a manner well known in the art. Embedded in the silicon wafer 22 is a single sense element 24. The output of the transducer of the sense element 24 is electrically connected to the inputs of a pair of signal conditioning circuits 26 and 28. The signal conditioning circuits 26 and 28 function to amplify and filter the output signal from the sense element 24 and generate an output signal to trigger an appropriate response from associated control device or devices. In the preferred embodiment, the signal conditioning circuits 26 and 28 are included in an ASIC. Similar to the sensor 2 described above, each of the conditioning circuits 26 and 28 is calibrated for a different ranges of linear acceleration, or 'G'-forces, in the case of accelerometers, or for a different range of angular velocity, in the case of angular rate sensors. In the preferred embodiment, the different ranges are non-overlapping. Thus, the sensor 20 provides two different output signal levels for one sense element 24. Each of the signal conditioning circuits 26 and 28 is connected to an associated control device labeled 30 and 32, respectively.

Figure 3:
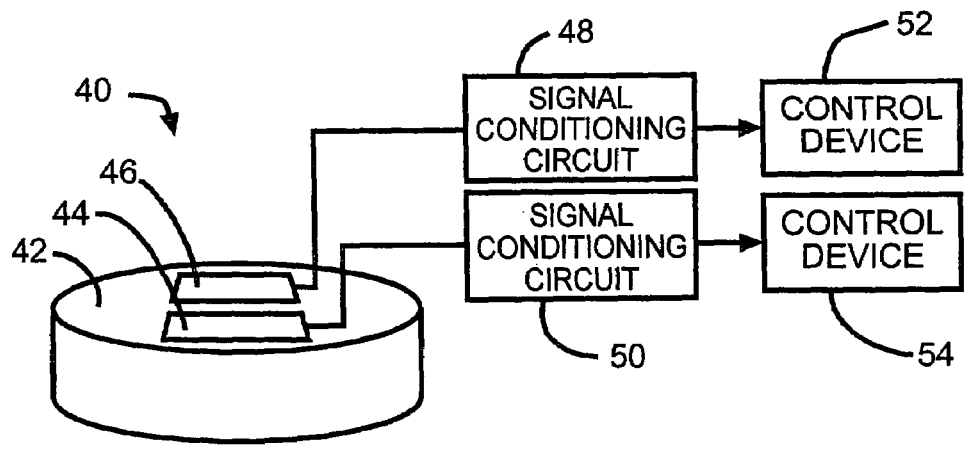
FIG. 3 is a schematic diagram of another alternative embodiment of the inertial sensor shown in FIG. 1.

Referring now to FIG. 3, another alternative embodiment of the multiple output inertial sensor is shown generally at 40. In this embodiment, the sensor 40 includes a silicon wafer 42 that is manufactured in a manner well known in the art. Embedded in the silicon wafer 42 are a pair of sense elements 44 and 46. The output of the transducer in each of the sense elements 44 and 46 is electrically connected to the input of a corresponding one of a pair of signal conditioning circuits 48 and 50. The signal conditioning circuits 48 and 50 function to amplify and filter the output signal from sense elements 44 and 46 and generate an output signal to trigger an appropriate response from associated control device or devices. In the preferred embodiment, the sense elements 44 and 46 are included in an ASIC. The sense elements 44 and 46 sense changes for different ranges of linear acceleration, in the case of accelerometers, or for different ranges in angular velocity, in the case of yaw sensors. As before, in the preferred embodiment, the ranges are non-overlapping. Each of the signal conditioning circuits 48 and 50 are further connected to a control device or system, which are labeled 52 and 54, respectively, that process the electrical signals and make an appropriate reaction to the sensed acceleration.

Figure 4:
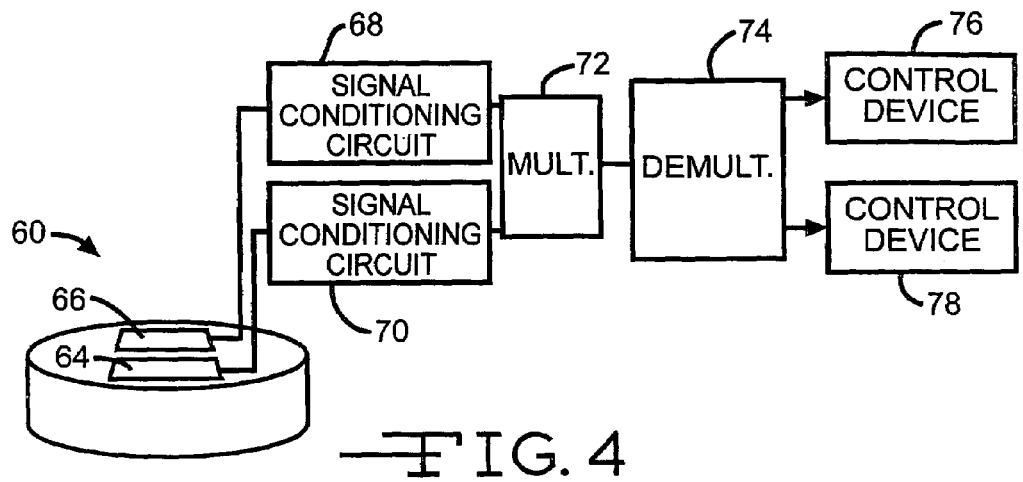
FIG. 4 is a schematic diagram of another alternative embodiment of the inertial sensor shown in FIG. 1.

Referring now to FIG. 4, another alternative embodiment of the multiple output inertial sensor is shown generally at 60. In this embodiment, the sensor 60 includes a silicon wafer 62 that is manufactured in a manner well known in the art. Embedded in the silicon wafer 62 are a pair of sense elements 64 and 66. The output of the transducer of each of the sense elements 64 and 66 are electrically connected to the input of a corresponding one of a pair of signal conditioning circuits 68 and 70. The signal conditioning circuits 68 and 70 function to amplify and filter the output signal from the sense elements 64 and 66 and generate an output signal to trigger an appropriate response from associated control device or devices. In the preferred embodiment, the signal conditioning circuits 68 and 70 are included in an ASIC. The sense elements 64 and 66 are preferably calibrated to sense changes for different ranges of linear acceleration, in the case of accelerometers, or for different ranges in angular velocity, in the case of angular rate sensors. As before, in the preferred embodiment, the ranges are non-overlapping.

As shown in FIG. 4, the outputs of the signal conditioning circuits 68 and. 70 are connected to a multiplexer 72, which enables the two electrical output signals to be temporarily combined into a single multiplexed signal. The multiplexer 72 transmits the multiplexed signal to a demultiplexer 74, that demultiplexes the signal into two separate signals for utilization by control devices or systems 76 and 78 that process the electrical signals and make an appropriate reaction to the sensed acceleration.

Figure 5:
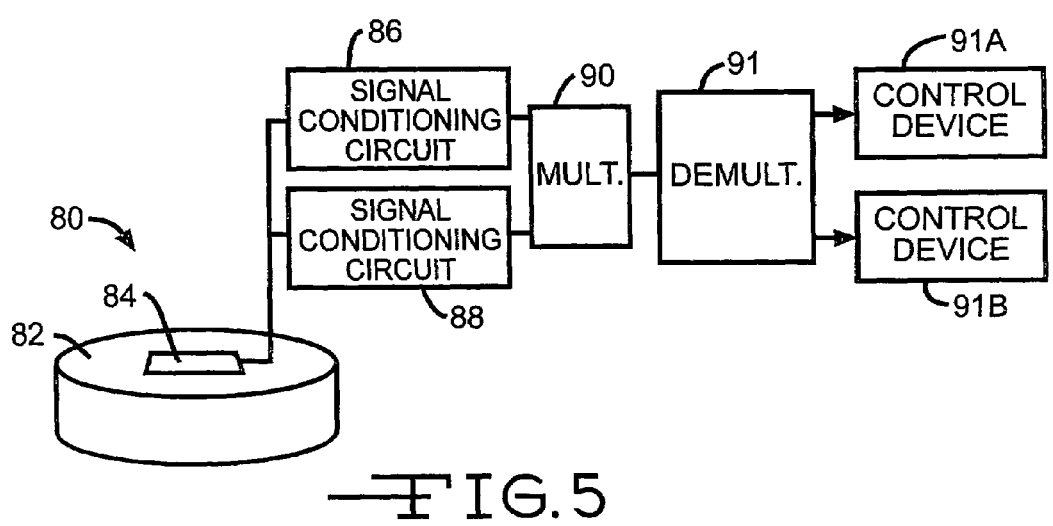
FIG. 5 is a schematic diagram of another alternative embodiment of the inertial sensor shown in FIG. 1.

Referring now to FIG. 5, another alternative embodiment of the multiple output inertial sensor is shown generally at 80. In this embodiment, the sensor 80 includes a silicon wafer 82 that is manufactured in a manner well known in the art. Embedded in the silicon wafer 82 is a single sense element 84. The output of the transducer of the sense element 84 is electrically connected to the inputs of two signal conditioning circuits 86 and 88. The signal conditioning circuits 86 and 88 function to amplify and filter the output signal from the sense element 84 and generate an output signal to trigger an appropriate response from associated control device or devices. In the preferred embodiment, the conditioning circuits 86 and 88 are included in an ASIC and are calibrated to sense changes for different ranges of linear acceleration, in the case of accelerometers, or for different ranges of angular velocity, in the case of angular rate sensors. As before, in the preferred embodiment, the ranges are non-overlapping. Thus, the signal conditioning circuits 86 and 88 provide two output signals of different magnitude from a single sense element 84.

The signal conditioning circuits 86 and 88 are further connected to a multiplexer 90, which enables the electrical signals to be temporarily combined into a single multiplexed signal. The multiplexer 90 transmits the multiplexed signal to a demultiplexer 91, that demultiplexes the signal into two separate signals for utilization by control devices or systems 91A and 91B that process the electrical signals and make an appropriate reaction to the sensed acceleration.

Figure 6:
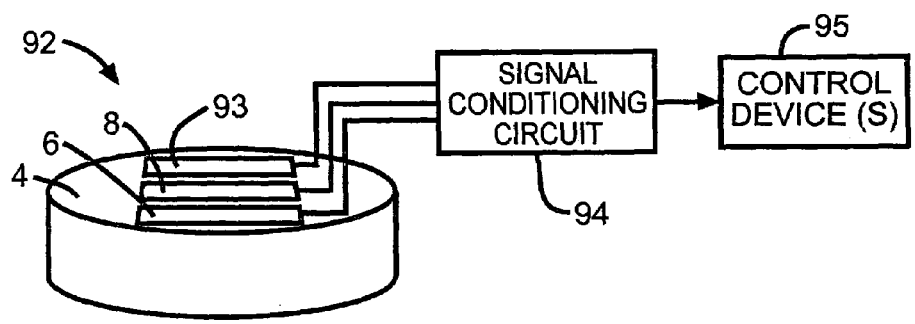
FIG. 6 is a schematic diagram of another alternate embodiment of the inertial sensor shown in FIG. 1.

It will be understood that, while the preferred embodiment of the invention has been described as utilizing one or two sense elements and one or two conditioning circuits, the invention also can be practiced with more than two sense elements or conditioning circuits or any combination of the above may be utilized. Accordingly, a sensor 92 is illustrated in FIG. 6 that is similar to the sensor 2 shown in FIG. 1, but the sensor 92 includes a third sense element 93 embedded in the wafer 4. Each of the three sense elements 6, 8, and 93 is calibrated to sense a different range of change in acceleration or rotational velocity and are connected to a single signal conditioning circuit 94. As before, in the preferred embodiment, the ranges are non-overlapping. The single conditioning circuit 94 generates a single output signal that includes the data provided by the three sense elements 6, 8 and 93 for utilization by control devices or systems 95.

Figure 7:
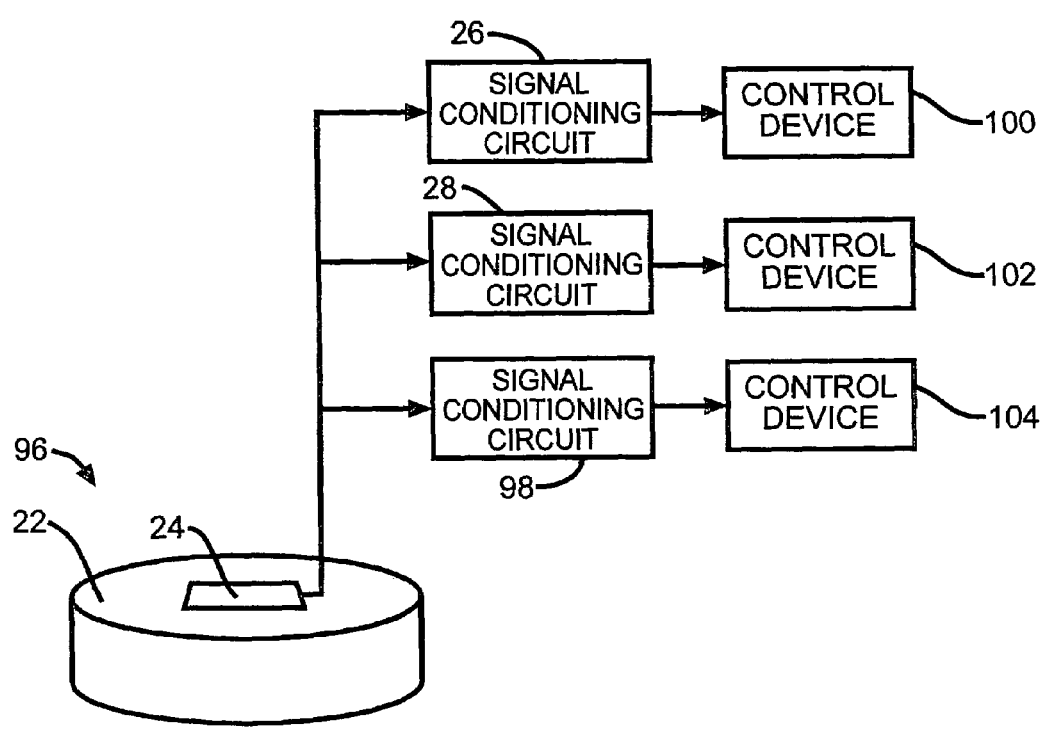
FIG. 7 is a schematic diagram of another alternate embodiment of the inertial sensor shown in FIG. 2.

Similarly, in FIG. 7, a sensor 96 is illustrated that includes a single sense element 24 that has the output of its transducer connected to three separate signal conditioning circuits, 26, 28, and 98. Each of the signal conditioning circuits is calibrated for a different range of sense element output signals. Accordingly, the sensor 96 is intended to generate three separate output signals that are in three non-overlapping ranges. While three sense elements are shown in FIG. 6 and three signal conditioning circuits are shown in FIG. 7, it will be appreciated that the invention also can be practiced with more than three sense elements and/or signal conditioning circuits. Each of the signal conditioning circuits 26, 28 and 98 are connected to an associated control device or system, labeled 100, 102 and 104, respectively.

Additionally, while the preferred embodiments of the invention have been described as having either the sense elements or signal conditioning circuits that are calibrated to sense non-overlapping ranges for changes in acceleration or rotational velocity, the invention also can be practiced with overlapping ranges. Furthermore, while the preferred embodiments of the invention has been illustrated and described as having either accelerometers or angular rate sensors carried by a single silicon wafer, it will be appreciated that the invention also can be practiced by combining both accelerometers and angular rate sensors upon a single silicon wafer.

Mounting multiple sense elements on a single silicon wafer is expected to significantly reduce the overall size requirements for inertial measurement while reducing manufacturing costs. Similarly, the use of multiplexed output signals will simplify wiring harness complexity and cost. By providing multiple sense elements on a single silicon wafer, the present invention provides greater packaging flexibility and reduces the size requirements of the inertial sensors as compared to the prior art inertial sensors. The present invention will prove particularly useful in those vehicle locations where it is desirable to provide signals for multiple systems. In the prior art, multiple sense elements with correspondingly larger space requirements were necessary. The present invention can utilize a single wafer with multiple sense elements, reducing the space requirements for the sensor systems.

In accordance with the provisions of the patent statutes, the present invention has been described in what is considered to represent its preferred embodiment. However, it should be noted that the invention can be practiced otherwise than as specifically illustrated and described without departing from its spirit or scope. For example, it should be understood that inertial sensors in accordance with the present invention could be installed on any number of devices where it is desirable to measure acceleration or angular velocity and, therefore, should not be limited to applications involving motor vehicles.

What is claimed is:

1. An inertial sensor adapted to be attached to a body comprising:
   a base member, said base member being formed from a silicon wafer;
   a single linear acceleration sensor element disposed on said base member, said linear sensor element operable to sense a change in linear acceleration of said body, said linear acceleration sensor element being the only sensor element disposed on said base member;
   a plurality of signal conditioning circuits that are located remotely from said silicon wafer and said linear acceleration sensor, said plurality of signal conditioning circuits connected to said linear sensor element, with a first one of said signal conditioning circuits being calibrated to sense a first range of change in said linear acceleration of said body and a second one of said signal conditioning circuits being calibrated to sense a second range of change in said same linear acceleration of said body, said second range of change in said linear acceleration of said body being different from said first range of change in said linear acceleration of said body, said signal conditioning circuits operable to generate a plurality of electrical output signals with each electrical output signal being a function of said change in said linear acceleration while also being within the calibration range associated with said signal conditioning circuit;
   a multiplexer for combining signals, said multiplexer connected to said signal conditioning circuits and operable to combine the output signals generated by said plurality of signal conditioning circuits into a single multiplexer output signal; and
   a demultiplexer for separating signals, said demultiplexer in communication with said multiplexer and operable to receive said single multiplexer output signal, said demultiplexer operative to separate said received signal into the individual output signals generated by said signal conditioning circuits and to supply said individual output signals to a plurality of control devices with each output signal being supplied to a selected one of said control devices.

2. The inertial sensor according to claim 1 wherein said signal conditioning circuits are included within an Application Specific Integrated Circuit.

3. An inertial sensor adapted to be attached to a body comprising:
   a base member, said base member being formed from a silicon wafer;
   a single linear acceleration sensor element disposed on said base member, said linear sensor element operable to sense a change in linear acceleration of said body, said linear acceleration sensor element being the only sensor element disposed on said base member;
   a plurality of signal conditioning circuits that are integral with said silicon wafer and said linear acceleration sensor, said plurality of signal conditioning circuits connected to said linear sensor element, with a first one of said signal conditioning circuits being calibrated to sense a first range of change in said linear acceleration of said body and a second one of said signal conditioning circuits being calibrated to sense a second range of change in said same linear acceleration of said body, said second range of change in said linear acceleration of said body being different from said first range of change in said linear acceleration of said body, said signal conditioning circuits operable to generate a plurality of electrical output signals with each electrical output signal being a function of said change in said linear acceleration while also being within the calibration range associated with said signal conditioning circuit;
   a multiplexer for combining signals, said multiplexer connected to said signal conditioning circuits and operable to combine the output signals generated by said plurality of signal conditioning circuits into a single multiplexer output signal; and
   a demultiplexer for separating signals, said demultiplexer in communication with said multiplexer and operable to receive said single multiplexer output signal, said demultiplexer operative to separate said received signal into the individual output signals generated by said signal conditioning circuits and to supply said individual output signals to a plurality of control devices with each output signal being supplied to a selected one of said control devices.

4. The inertial sensor according to claim 3 wherein said signal conditioning circuits are included within an Application Specific Integrated Circuit.

5. An inertial sensor adapted to be attached to a body comprising:
   a base member, said base member being formed from a silicon wafer;
   a single linear acceleration sensor element disposed on said base member, said linear sensor element operable to sense a change in linear acceleration of said body, said linear acceleration sensor element being the only sensor element disposed on said base member;
   a plurality of signal conditioning circuits connected to said linear sensor element, with a first one of said signal conditioning circuits being calibrated to sense a first range of change in said linear acceleration of said body and a second one of said signal conditioning circuits being calibrated to sense a second range of change in said same linear acceleration of said body, said second range of change in said linear acceleration of said body being different from said first range of change in said linear acceleration of said body, said signal conditioning circuits operable to generate a plurality of electrical output signals with each electrical output signal being a function of said change in said linear acceleration while also being within the calibration range associated with said signal conditioning circuit;

a multiplexer for combining signals, said multiplexer connected to said signal conditioning circuits and operable to combine the output signals generated by said plurality of signal conditioning circuits into a single multiplexer output signal; and a demultiplexer for separating signals, said demultiplexer in communication with said multiplexer and operable to receive said single multiplexer output signal, said demultiplexer operative to separate said received signal into the individual output signals generated by said signal conditioning circuits and to supply said individual output signals to a plurality of control devices with each output signal being supplied to a selected one of said control devices.

* * * * *